United States Patent
Anderson et al.

(10) Patent No.: US 9,052,022 B2
(45) Date of Patent: Jun. 9, 2015

(54) BELLOWS ENERGIZED SEAL ASSEMBLY FOR A ROTARY CONTROL VALVE

(75) Inventors: Shawn W. Anderson, Haverhill, IA (US); Ted D. Grabau, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 165 days.

(21) Appl. No.: 13/544,419

(22) Filed: Jul. 9, 2012

(65) Prior Publication Data

US 2013/0015383 A1 Jan. 17, 2013

Related U.S. Application Data

(60) Provisional application No. 61/506,568, filed on Jul. 11, 2011.

(51) Int. Cl.
*F16K 5/20* (2006.01)

(52) U.S. Cl.
CPC ..................... *F16K 5/207* (2013.01)

(58) Field of Classification Search
CPC ................................. F16K 5/204; F16K 5/207
USPC ......... 251/180, 192, 314, 316, 317, 170, 172; 277/391, 389, 581
See application file for complete search history.

(56) References Cited

U.S. PATENT DOCUMENTS

| | | | | |
|---|---|---|---|---|
| 2,548,128 A * | 4/1951 | Snyder | | 251/174 |
| 2,575,818 A * | 11/1951 | Kosatka | | 277/373 |
| 2,841,121 A * | 7/1958 | George | | 91/467 |
| 3,204,924 A * | 9/1965 | Bredtschneider | | 251/174 |
| 3,266,769 A * | 8/1966 | Shand | | 251/172 |
| 3,276,780 A * | 10/1966 | Andresen et al. | | 277/391 |
| 3,472,270 A | 10/1969 | Masheder | | |
| 3,512,790 A * | 5/1970 | Mancel | | 277/375 |
| 4,087,098 A * | 5/1978 | Alley | | 277/500 |
| 4,095,808 A * | 6/1978 | Glasson | | 277/372 |
| 4,123,069 A * | 10/1978 | Sato | | 277/391 |
| 4,165,081 A * | 8/1979 | F'Geppert | | 277/379 |
| 4,215,722 A * | 8/1980 | Sigmon | | 137/625.3 |
| 4,217,923 A * | 8/1980 | Kindersley | | 137/315.21 |
| 4,453,722 A * | 6/1984 | Swanson | | 277/379 |
| 4,575,045 A * | 3/1986 | Martin et al. | | 251/172 |

(Continued)

FOREIGN PATENT DOCUMENTS

| | | | | |
|---|---|---|---|---|
| DE | 89 07 606 | 10/1990 | | |
| EP | 0202666 B1 * | 8/1990 | | F16K 5/06 |

(Continued)

OTHER PUBLICATIONS

Raw Machine Translation of EP0483611 "Engelke" provided by the EPO.*

(Continued)

*Primary Examiner* — John K Fristoe, Jr.
*Assistant Examiner* — David Colon Morales
(74) *Attorney, Agent, or Firm* — Marshall, Gerstein & Borun LLP

(57) ABSTRACT

A bellows energized seal assembly includes a seal body, a main seal that is axially slidable within the seal body, and a bellows connected to the seal body and the main seal. The bellows both biases the main seal and provides a seal between the seal body and the main seal.

17 Claims, 7 Drawing Sheets

(56) References Cited

U.S. PATENT DOCUMENTS

| | | | |
|---|---|---|---|
| 4,676,480 A * | 6/1987 | Garceau et al. | 251/159 |
| 4,747,578 A * | 5/1988 | Kivipelto et al. | 251/159 |
| 5,076,737 A * | 12/1991 | Loutsch et al. | 406/183 |
| 5,101,853 A * | 4/1992 | Mailliet et al. | 137/242 |
| 5,247,964 A | 9/1993 | DeLange | |
| 6,729,622 B2 * | 5/2004 | Vedsted et al. | 277/371 |
| 6,773,017 B2 * | 8/2004 | Henningson | 277/391 |
| 6,988,708 B2 * | 1/2006 | Caprera | 251/171 |
| 7,484,710 B2 | 2/2009 | Koester et al. | |
| 2003/0178595 A1 * | 9/2003 | Koester et al. | 251/174 |
| 2003/0230851 A1 * | 12/2003 | Roddis et al. | 277/391 |
| 2004/0070151 A1 * | 4/2004 | Klenk et al. | 277/391 |
| 2005/0211842 A1 | 9/2005 | Hoffjann et al. | |
| 2006/0231786 A1 * | 10/2006 | Witt | 251/174 |
| 2009/0065726 A1 * | 3/2009 | Hostetter et al. | 251/315.01 |
| 2010/0229962 A1 * | 9/2010 | Frenzel | 137/315.19 |

FOREIGN PATENT DOCUMENTS

| | | | |
|---|---|---|---|
| EP | 0202666 B1 * | 8/1990 | |
| EP | 0483611 A1 | 5/1992 | |
| FR | 2469632 A1 * | 11/1979 | |
| GB | 2184212 A * | 6/1987 | F16K 5/20 |

OTHER PUBLICATIONS

Raw Machine Translation of FR2469632 "Bormioli" provided by the EPO.*
Raw Machine Translation of EP8907606 "Burgmann" provided by the EPO.*
International Search Report for PCT/US2012/045903, mailed Oct. 2, 2012.
Written Opinion for PCT/US2012/045903, mailed Oct. 2, 2012.
International Preliminary Report on Patentability for Application No. PCT/US2012/045903, dated Jan. 14, 2014.

* cited by examiner

BELLOWS ENERGIZED SEAL ASSEMBLY FOR A ROTARY CONTROL VALVE

FIELD OF THE DISCLOSURE

The disclosure relates to fluid control valves and, more particularly, to bellows energized seal assemblies for use in rotary control valves.

BACKGROUND OF THE DISCLOSURE

Rotary control valves are used in a wide number of process control system applications to control some parameter of a process fluid (this may be a liquid, gas, slurry, etc.). While the process control system may use a control valve to ultimately control the pressure, level, pH or other desired parameter of a fluid, the control valve basically controls the rate of fluid flow.

Typically, a rotary control valves may include a valve body having a fluid inlet and a fluid outlet separated by a ball element which, by rotating about a fixed axis and abutting a seal assembly, controls the amount of fluid flow therethrough. During operation, the process control system, or an operator controlling the control valve manually, rotates the ball element against, or away from a surface of the seal assembly, thereby exposing a flow passage, to provide a desired fluid flow through the inlet and outlet and, therefore, the rotary control valve.

Rotary control valve components, including the ball element and the seal assembly, are typically constructed of metal; this stands especially true when used in high pressure and/or high temperature applications. However, the ball element and seal assembly suffer wear due to the repeated extensive engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly. Similarly, because the frictional forces tend to increase as the components become more worn, the dynamic performance and control characteristics within the valve are worsened, resulting in inefficiencies and inaccuracies in the valve.

In the past, attempts have been made to incorporate a biased main seal into the seal assembly to correct the above mentioned problems. Some designs have incorporated a Teflon® radial seal to enhance sealing performance under high-temperature operations. Ball valves having Teflon® radial seals are generally used in operating environments having temperatures up to approximately 550° F. Above 550° F., a graphite piston ring is currently used because Teflon® deteriorates above approximately 550° F. Graphite piston rings, while able to withstand higher temperatures, are do not seal as well as Teflon® radial seals.

Biased main seals, however, form secondary flow paths that require secondary seals to prevent fluid from flowing through the secondary flow path when the valve is closed.

In one example of a known rotary control valve, as illustrated in FIGS. 1-4, a ball valve 20 includes a valve body or housing 30 having a primary flowpath 33 between an inlet 31 and an outlet 32, a seal assembly 50 attached to the housing 30, and a ball element 80 mounted on rotatable shafts 90 and 91 disposed within the housing 30.

The housing 30, having a generally cylindrical shape, defines the primary flowpath 33 for a fluid traveling therethrough. At the bottom of the housing 30, as oriented in FIG. 2, is the outlet 32 of the primary flowpath 33, the outlet 32 being surrounded by an outlet flange 38. In a middle portion of the housing 30, a thru hole 40 penetrates the right wall of the housing 30, and a blind hole 41 opens to the interior of the housing 30, both holes 40 and 41 receive the shafts 90 and 91, respectively. Disposed between the drive shaft 90 and the outer right wall or drive end of the housing 30, is a packing follower 42, a set of packing rings 44, and a bearing 43a. Located on the drive end of housing 30, and engaging with fasteners 35, is an actuator mounting flange 34. Now turning to the top of the housing 30, still as oriented in FIG. 2, is a counterbore 39, creating the inlet 31 of the primary flowpath 33 and, receiving the seal assembly 50. Surrounding the inlet 31 is an inlet flange 36, the inlet flange 36 may be used to fasten or attach the valve 20 to an incoming pipe (not shown).

The seal assembly 50, as shown best in FIG. 4, includes a main seal 64, and a seal housing 52. As mentioned above, the seal assembly 50 is disposed within the counterbore 39 of the housing 30, and more specifically, an exterior surface 54 of the seal housing 52 is fixedly attached within the counterbore 39. On an interior surface 53 of the seal housing 52, is a pair of annular shoulders 55a & 55b, which receive a dynamic C-seal 60 and a resilient biasing member, such as a wave spring 70, respectively. The C-seal 60 and the resilient member 70 connect the main seal 64 to the seal housing 52. The resilient member 70 biases the main seal 64 toward the ball element 80, by the addition of which a secondary flowpath 77 between the main seal 64 and the seal housing 52 is created. The C-seal creates a flow restriction of the fluid through the secondary flowpath 77. The C-seal is trapped between an annular shoulder 74 on the main seal and an annular shelf 76 on the seal housing 52. An opening of the C-seal 63 faces away from the ball 80 and toward the incoming fluid.

Abutting the main seal 64, when the valve 20 is in the closed position, is the ball element 80 (FIG. 4). The ball element 80 includes a spherical surface 82 that engages the main seal 64 when the valve is in the closed position. Attached to the ball element 80, through thru holes 84a & 84b are the follower shaft 91 and the drive shaft 90, respectively.

To close the valve, the ball element 80 is rotated to abut the main seal 64, thereby creating a flow restriction of the primary flowpath 33 at a contact point 66. As shown in FIG. 4, when the ball element 80 presses against the main seal 64, the main seal 64 may be displaced into the seal housing 52 by compressing the resilient member 70. To ensure proper movement and operation of the main seal 64, relative to the ball element 80 and the seal housing 52, a predetermined or calculated gap 71 created between the main seal 64 and the seal housing 52. The gap 71 is set to ensure that the main seal 64 contacts the ball element 80, when the valve 20 is in the closed position. Working in combination with the gap 71 to ensure proper movement and operation of the valve 20, is a gap 73 created between the main seal 64 and the housing 30. The gap 73 ensures that the main seal 64 comes into direct contact with the housing 30, at the proper time, when the valve 20 is opening and closing.

As the ball element 80 rotates toward the closed position, the ball element 80 contacts the main seal 64, thereby causing the gap 71 to become smaller as the ball element 80 rotates further into the fully closed position. Also shown in FIG. 4 is the secondary flowpath 77, created between the main seal 64 and the seal housing 52 for accommodation of the resilient member 70.

When the ball valve 20 is in the closed position, high pressure forces are created at the inlet 31. The increase of pressure may force the process fluid to bypass the primary flowpath restriction and be forced through the secondary flowpath 77. Preventing the fluid from penetrating through the secondary flowpath 77 is the dynamic C-seal 60. The main seal 64 will continue to be biased against the ball element 80, until the main seal 64 is stopped, or the resilient member 70 is fully decompressed.

One problem with known rotary control valves, such as the ball valve illustrated in FIGS. 1-4, is that the secondary flowpath, created by the biased main seal, must itself be sealed when the valve is in a closed position. This additional seal, often in the form of a dynamic radial seal, adds complexity, difficulty in manufacturing, and additional points of failure to known ball valves.

SUMMARY OF THE DISCLOSURE

In accordance with a first exemplary aspect, a bellows energized seal assembly includes a seal body, a main seal that is axially slidable within the seal body, and a bellows connected to the seal body and the main seal. The bellows both biases the main seal and provides a seal between the seal body and the main seal.

In accordance with a second exemplary aspect, a rotary control valve includes a bellows energized seal assembly, a valve body having a fluid inlet and a fluid outlet, and a ball element. The bellows energized seal assembly includes a biased main seal and bellows that biases the main seal towards the ball element. The bellows energized seal assembly eliminates secondary fluid flowpaths and the need to seal such secondary flowpaths.

In further accordance with any one or more of the foregoing first or second aspects, a bellows energized seal assembly or a rotary control valve including a bellows energized seal assembly may further include any one or more of the following preferred forms.

In some preferred forms, the bellows energized seal assembly may include a body annular flange extending inwardly from the seal body, substantially perpendicular to a longitudinal axis of the bellows energized seal assembly. The body annular flange may form a stop for the main seal and/or a seat for the bellows.

In other preferred forms, the bellows energized seal assembly may include a seal annular flange that extends inwardly from the main seal, substantially perpendicular to the longitudinal axis of the bellows energized seal assembly. The seal annular flange may form a seat for the bellows.

In yet other preferred forms, the bellows energized seal assembly may include an outer body portion that extends in a direction substantially parallel to the longitudinal axis and an outer seal portion that extends substantially parallel to the longitudinal axis, the outer seal portion being disposed between the bellows and the outer body portion.

In yet other preferred forms, the bellows may be welded to one of the seal annular flange and the body annular flange. The bellows may be made from stainless steel, Inconel/Hastelloy, titanium, or other similar materials.

In yet other preferred embodiments, the main seal may include a seal surface that is coated with one or more of stainless steel, PEEK, graphite, solid carbon, PTFE, and PTFE composites.

In yet other preferred embodiments, the rotary control valve may include a static seal between the valve body and the bellows energized seal assembly. The bellows energized seal assembly may be secured to the valve body with one or more of a threaded connection, an interference fit, and a weld.

In yet other preferred embodiments, the seal body may include an outer annular flange, the outer annular flange being seated on the valve body. An o-ring may be disposed in an annular channel between the valve body and the outer annular flange.

Figure 1:
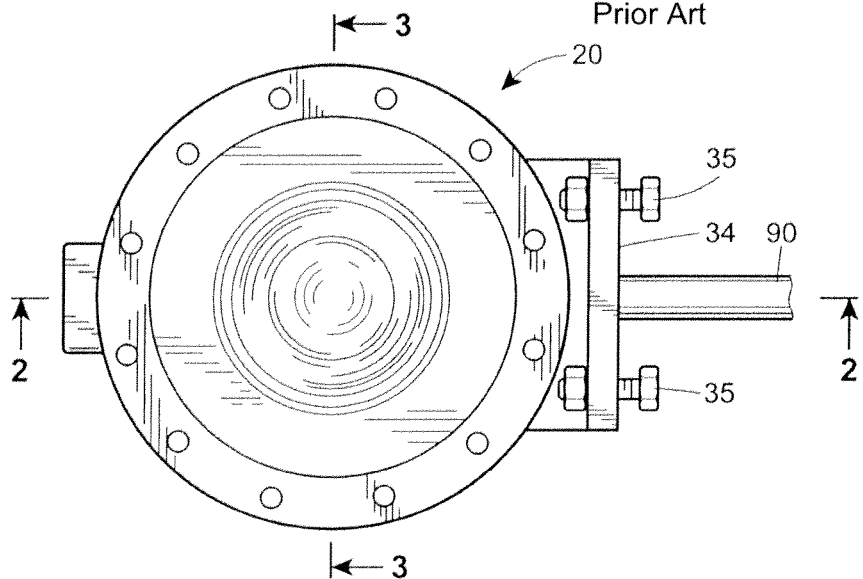
FIG. 1 is a top view of a known ball valve.
Figure 2:
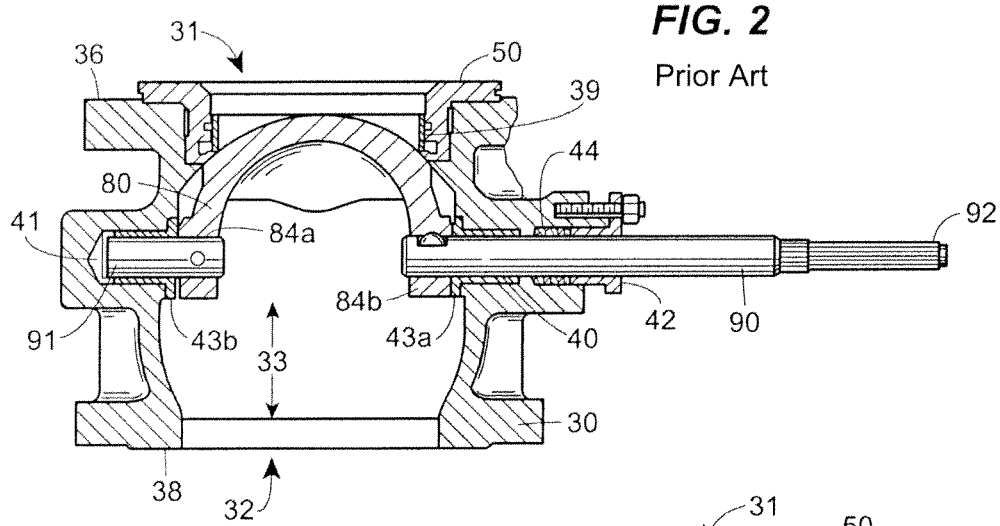
FIG. 2 is a cross-sectional view of the ball valve of FIG. 1, taken along line 2-2 of FIG. 1.
Figure 3:
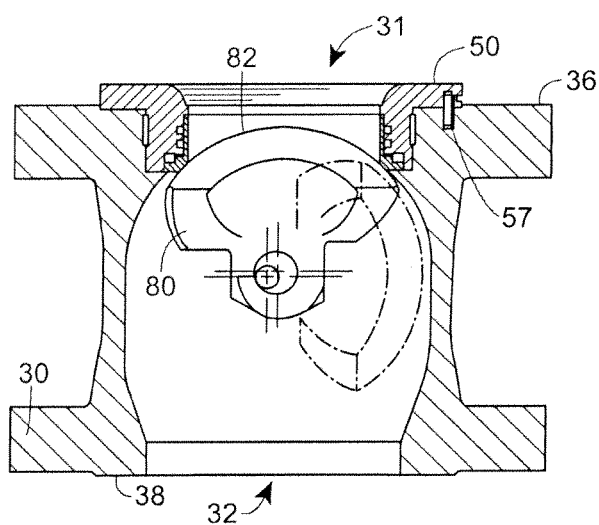
FIG. 3 is a cross-sectional view of the ball valve of FIG. 1, taken along line 3-3 of FIG. 1, and with the location of the ball element when the valve is in the open position being shown in phantom.
Figure 4:
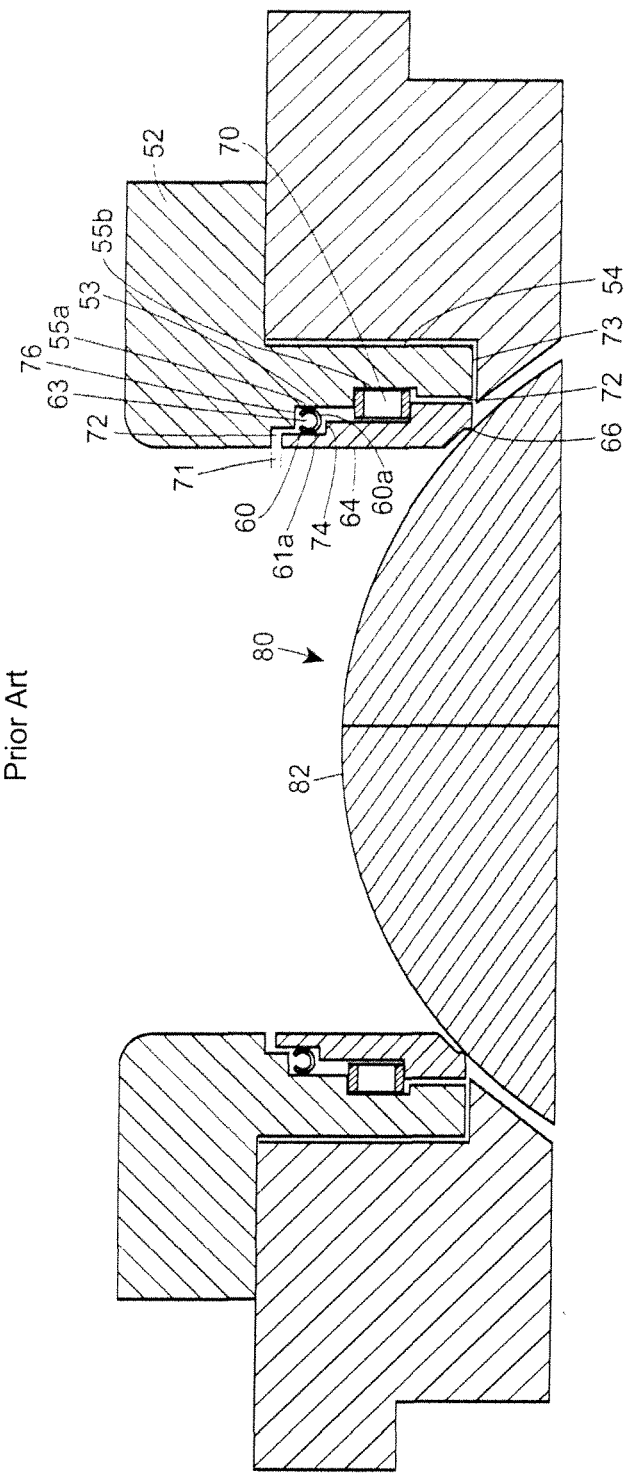
FIG. 4 is a close up view of the ball element and seal assembly of FIG. 3.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Figure 5A:
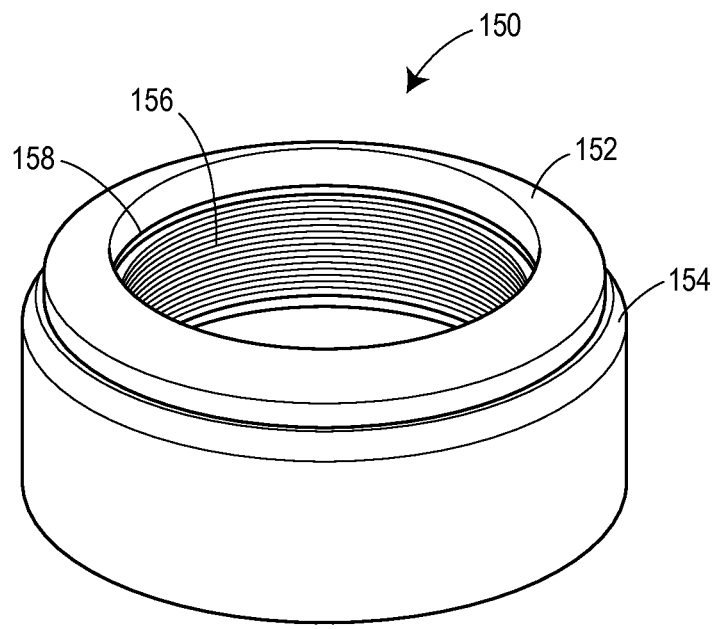
FIG. 5A is a top perspective view of a bellows energized seal assembly.
Figure 5B:
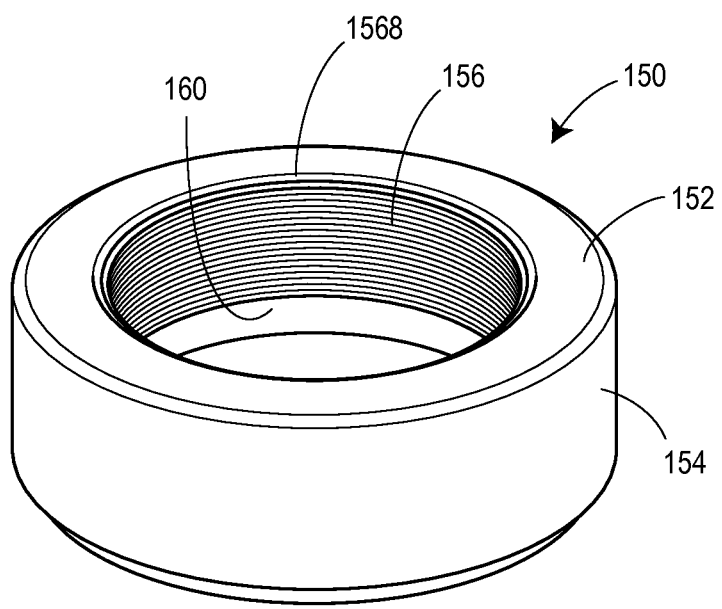
FIG. 5B is a bottom perspective view of the bellows energized seal assembly of FIG. 5A.
Figure 6:
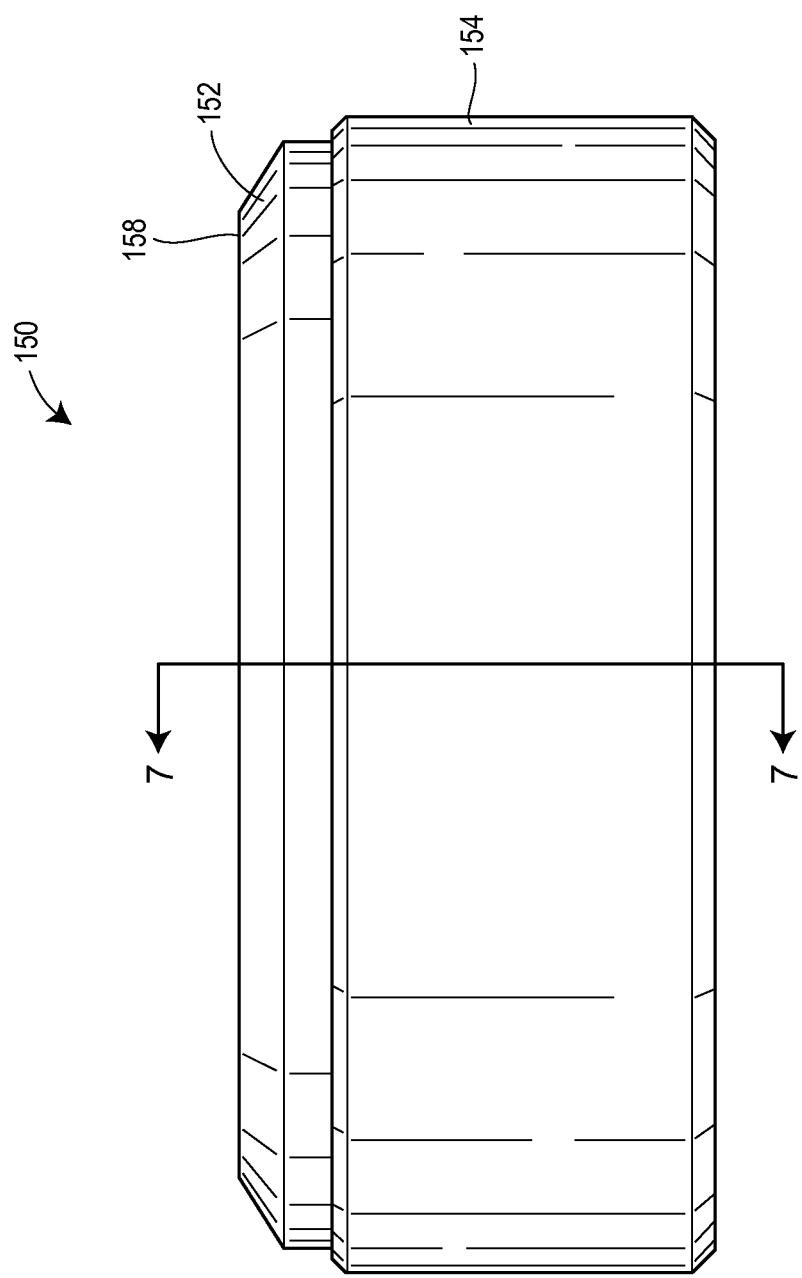
FIG. 6 is a side view of the bellows energized seal assembly of FIG. 5A.
Figure 8:
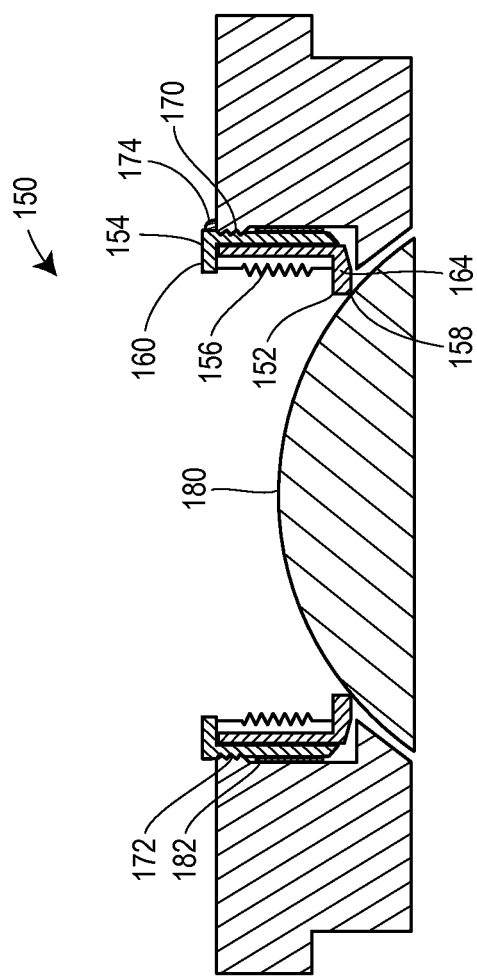
FIG. 8 is a cross-sectional view of a rotary control valve including the bellows energized seal assembly of FIG. 5A.

Turning now to FIGS. 5A, 5B, and 6, a bellows energized seal assembly 150 is illustrated. The bellows energized seal assembly 150 may be used to replace the seal assembly 50 (FIGS. 1-4) in known ball valves. The bellows energized seal assembly 150 includes a main seal 152, a seal body 154, and a bellows 156 connecting the main seal 152 to the seal body 154. The main seal 152 is axially movable within the seal body 154 and the bellows 156 biases the main seal 152 towards the ball element 180 (FIG. 8). When the valve is closed, the ball element 180 contacts the main seal 152 at a seal surface 158 to restrict fluid flow through the valve. The seal surface 158 may be chamfered or angled to provide greater sealing contract with the ball element 180.

Figure 7:
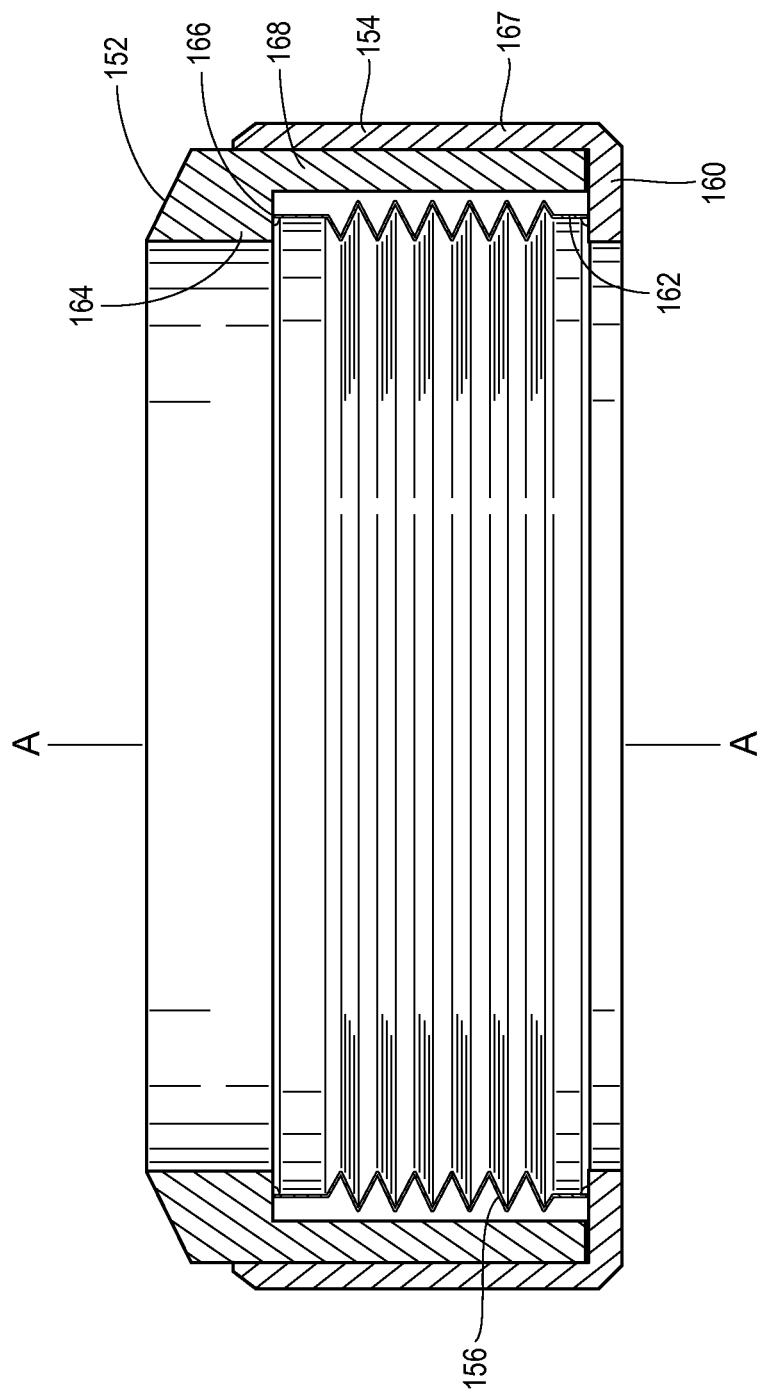
FIG. 7 is a cross-sectional side view of the bellows energized seal assembly of FIG. 5A taken along line 7-7 of FIG. 6.

The seal body 154 may include a body annular flange 160 at one end, the body annular flange 160 extending inwardly, substantially perpendicular to a longitudinal axis A of the bellows energized seal assembly 150 (FIG. 7). The body annular flange 160 forms a stop for the main seal 152 to prevent the main seal 152 from retracting beyond a certain point due to pressure from the ball element 180. The body annular flange 160 also forms a seat or attachment point 162 for a first end of the bellows 156. Opposite the body annular flange 160, the main seal 152 includes a seal annular flange 164. The seal annular flange 164 extends inwardly, substantially perpendicular to the longitudinal axis A. The seal annular flange 164 forms a seat or attachment point 166 for a second end of the bellows 156, the bellows 156 being disposed between the seal annular flange 164 and the body annular flange 160.

An outer body portion 167 of the seal body 154 extends substantially parallel to the longitudinal axis A. Similarly, an outer seal portion 168 of the seal body 152 extends substantially parallel to the longitudinal axis A, the outer seal portion 168 being disposed substantially between the bellows 156 and the outer body portion 167. Because the bellows 156 produces a biasing force that acts in a direction that is substantially parallel to the longitudinal axis A, the main seal 152 is longitudinally movable within, or relative to, the seal body 154. Furthermore, the bellows 156 prevents process fluid from accessing any location where the main seal 152 and the seal body 154 meet, thus preventing fluid leaks between the main seal 152 and the seal body 154. In one embodiment, the bellows 156 may be welded or otherwise secured to the inner seal flange 164 and the inner body flange 160 in a fluid sealing manner. As a result, the junction between the main seal 152 and the seal body 154 is not subject to becoming clogged with particulate matter that may be present in the process fluid stream. Thus, the longitudinal slidability between the main seal 152 and the seal body 154 remains very efficient and reliable.

The seal surface 158 may be coated with a wear resistant material, such as Alloy 6, S31600 SST, or PEEK. For high temperature seals, the seal surface 158 may be coated with, or otherwise made of, flexible graphite or solid carbon.

The bellows 156 may be made of any durable, temperature resistant material, such as, for example, S31600 SST, Inconel/Hastelloy, Titanium, AM350 SS, or similar temperature resistant materials. Because the bellows 156 both seals and biases the main seal 152, there is no flexible temperature sensitive biasing element needed. As a result, the disclosed bellows energized seal assembly 150 may be used in very high temperature environments without losing biasing or sealing capability. In some embodiments, the bellows energized seal assembly 150 may be used in rotary valves that are subject to temperatures up to 1000° F.

If desired, a static seal, such as a gasket 182 (FIG. 8), may be positioned between the bellows energized seal assembly 150 and the valve body 136 to assist sealing between the bellows energized seal assembly 150 and the valve body 136.

As discussed above, the bellows 156 is connected to both the main seal 152 and the seal body 154 and the bellows 156 biases the main seal 152 towards the ball element 180. Because the bellows 156 is connected to both the main seal 152 and the seal body 154, no secondary flow path is created. In other words, any fluid trying to flow between the main seal 152 and the seal body 154 is stopped by the bellows 156. Thus, there is no need for radial dynamic seals to seal a secondary flow path, as is the case with known ball valves. Moreover, the bellows 156 performs two functions, sealing the main seal 152 and the seal body 154 and biasing the main seal 152. As a result, there is no need for a separate biasing element, such as a wave spring.

The bellows energized seal assembly 150 may replace known seal assemblies. As illustrated in FIG. 8, the bellows energized seal assembly 150 may be may be secured to the valve body 136 via a threaded connection 170. Alternatively, other methods of connection may be used. For example, the bellows energized ball seal 150 may be attached to a valve body via an interference fit 172, adhesives or welds 174, packing nuts, or virtually any other attachment mechanism. Moreover, the bellows energized seal assembly 150 may be assembled in the valve as a unit or sub-assembly, thus increasing manufacturing efficiency.

The seal body 154 does not move longitudinally relative to the valve body 136. As a result, the bellows energized seal assembly 150 advantageously does not require any dynamic seals between the seal body 154 and the valve body 136. Dynamic seals are not suitable for high temperature environments and are generally not as durable as static seals.

Figure 9:
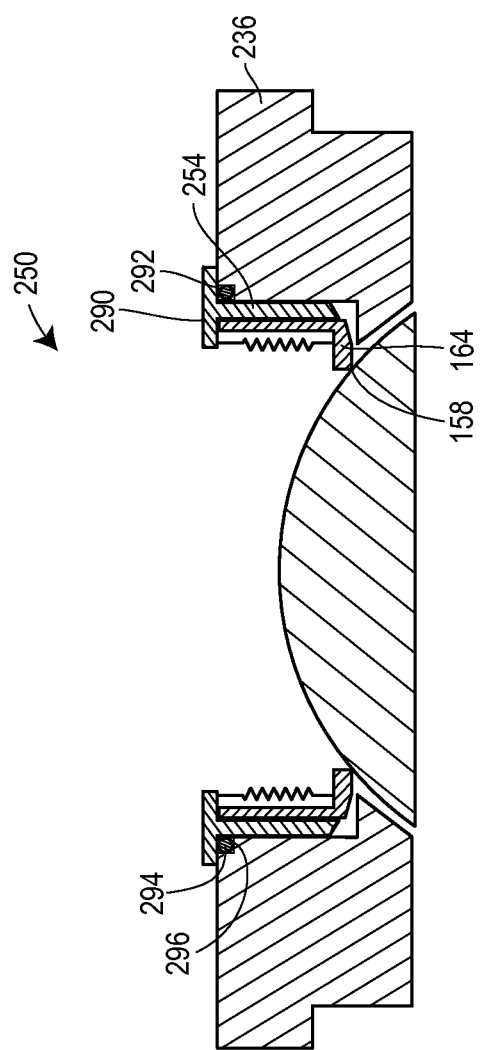
FIG. 9 is a cross-sectional view of a rotary control valve including an alternate embodiment of a bellows energized seal assembly.

In another embodiment, illustrated in FIG. 9, the seal body 254 may include an outer annular flange 290. The outer annular flange 290 may provide a stop or seat surface 292 that rests against the valve body 236 when the bellows energized seal assembly 250 is fully seated within the valve body 236. Optionally, a static seal, such as an o-ring 294 may be located between the outer annular flange 290 and the valve body 236. The o-ring 294 may be disposed in an annular recess 296 in some embodiments.

In yet another embodiment, the bellows may include registration holes to equalize pressure distribution across the bellows energized seal assembly and to assist the biasing of the main seal towards the ball element.

In yet other embodiments, the bellows energized seal assembly could advantageously be replaced without removal of valve trim.

In yet other embodiments, the bellows may include some level of process pressure assist.

In yet other embodiments, the seal surface may be coated with softer materials to aid in tight shut-off seals. Such materials include, but are not limited to, PTFE or PTFE composites.

In yet other embodiments, the ball element may include ears that cam the bellows energized seal assembly away from the ball element, which would result in a reduction of impact forces between the bellows energized seal assembly and the ball element at closing.

The foregoing detailed description has been given for clearness of understanding only and no unnecessary limitations should be understood therefrom, as modifications will be obvious to those skilled in the art.

The invention claimed is:

1. A bellows energized seal assembly for a rotary control valve, the bellows energized seal assembly comprising:
   a seal body, the seal body including a body annular flange that extends inwardly, substantially perpendicular to a longitudinal axis of the bellows energized seal assembly;
   a main seal axially slidable relative to the seal body; and
   a bellows connected to the seal body and to the main seal, the bellows both biasing the main seal towards a ball element, and providing a seal between the seal body and the main seal,
   wherein the seal body includes an outer body portion that extends substantially parallel to the longitudinal axis of the bellows energized seal assembly, the main seal includes an outer seal portion that extends substantially parallel to the longitudinal axis of the bellows energized seal assembly, the outer seal portion is disposed between the bellows and the outer body portion, and the body annular flange forms a stop for the outer seal portion, thereby limiting longitudinal displacement of the main seal relative to the seal body, the outer seal portion contacting the body annular flange between the bellows and the outer body portion when the main seal is located at the stop limit.

2. A bellows energized seal assembly according to claim 1, wherein the body annular flange forms a seat for the bellows.

3. A bellows energized seal assembly according to claim 1, wherein the main seal includes a seal surface that is coated with one of stainless steel, PEEK, graphite, solid carbon, PTFE, and a PTFE composite.

4. A bellows energized seal assembly according to claim 1, wherein the bellows is made from one of stainless steel, Inconel/Hastelloy, and titanium.

5. A bellows energized seal assembly according to claim 1, wherein the bellows is welded to one of the seal body and the main seal.

6. A bellows energized seal assembly according to claim 1, wherein the bellows is disposed radially inward of both the outer body portion and the outer seal portion.

7. A bellows energized seal assembly according to claim 1, wherein the main seal includes a seal annular flange.

8. A bellows energized seal assembly according to claim 7, wherein the seal annular flange extends inwardly, substantially perpendicular to the longitudinal axis of the bellows energized seal assembly.

9. A bellows energized seal assembly according to claim 8, wherein the seal annular flange forms a seat for the bellows.

10. A bellows energized seal assembly according to claim 9, wherein the bellows is disposed between the body annular flange and the seal annular flange.

11. A rotary control valve comprising:
a valve body having a fluid inlet and a fluid outlet;
a ball element disposed within the valve body; and
a bellows energized seal assembly disposed within the valve body, the bellows energized seal assembly including:
a seal body, the seal body including an annular flange that extends inwardly, substantially perpendicular to a longitudinal axis of the bellows energized seal assembly;
a main seal axially slidable relative to the seal body; and
a bellows connected to the seal body and to the main seal, the bellows both biasing the main seal towards the ball element and providing a seal between the seal body and the main seal,
wherein the seal body includes an outer body portion that extends substantially parallel to the longitudinal axis of the bellows energized seal assembly, the main seal includes an outer seal portion that extends substantially parallel to the longitudinal axis of the bellows energized seal assembly, the outer seal portion is disposed between the bellows and the outer body portion, and the body annular flange forms a stop for the outer seal portion, thereby limiting longitudinal displacement of the main seal relative to the seal body, the outer seal portion contacting the body annular flange between the bellows and the outer body portion when the main seal is located at the stop limit, and
wherein the ball element cooperates with the main seal of the bellows energized seal assembly to control fluid flow through the rotary control valve.

12. A rotary control valve according to claim 11, further comprising a static seal between the valve body and the bellows energized seal assembly.

13. A rotary control valve according to claim 11, further comprising one of a threaded connection, an interference fit, and a weld between the valve body and the bellows energized seal assembly.

14. A rotary control valve according to claim 11, wherein the seal body includes an outer annular flange extending radially outward from the seal body.

15. A rotary control valve according to claim 14, wherein the outer annular flange rests against the valve body.

16. A rotary control valve according to claim 15, further comprising an o-ring seal between the outer annular flange and the valve body.

17. A rotary control valve according to claim 16, wherein the o-ring is disposed in an annular recess in the valve body.

* * * * *

UNITED STATES PATENT AND TRADEMARK OFFICE
CERTIFICATE OF CORRECTION

| | | |
|---|---|---|
| PATENT NO. | : 9,052,022 B2 | Page 1 of 1 |
| APPLICATION NO. | : 13/544419 | |
| DATED | : June 9, 2015 | |
| INVENTOR(S) | : Shawn W. Anderson et al. | |

It is certified that error appears in the above-identified patent and that said Letters Patent is hereby corrected as shown below:

<u>In the Drawings:</u>

At Fig. 5B, Sheet 3 of 7, "1568" should be -- 158 --.

Signed and Sealed this
Third Day of May, 2016

Michelle K. Lee
*Director of the United States Patent and Trademark Office*